Sept. 24, 1957 W. J. CALDWELL 2,807,329
EXPANDER SILENCER UNIT
Filed May 7, 1951 3 Sheets-Sheet 3
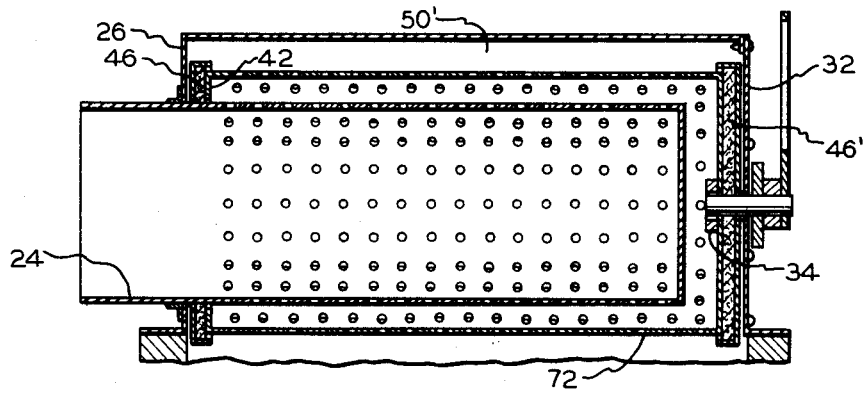
FIG. VIII.
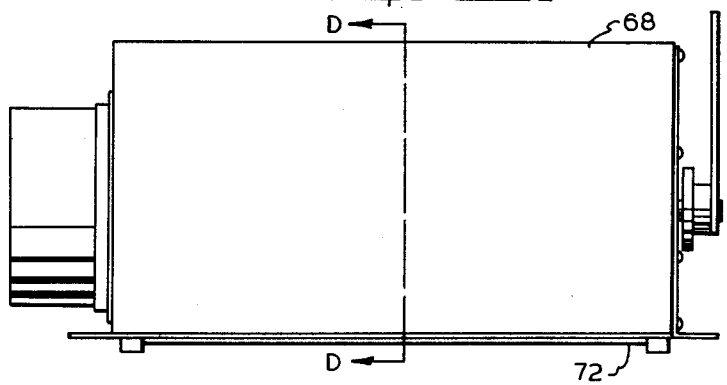
FIG. VII.
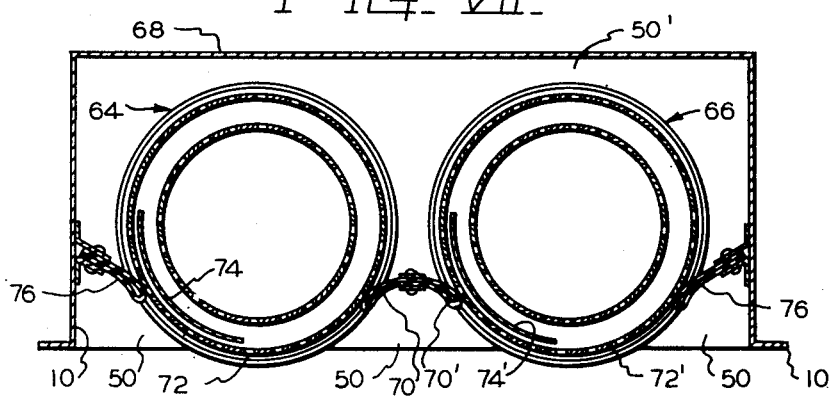
FIG. IX.
INVENTOR
WILLIAM J. CALDWELL
BY
ATTORNEY

# United States Patent Office 2,807,329
Patented Sept. 24, 1957

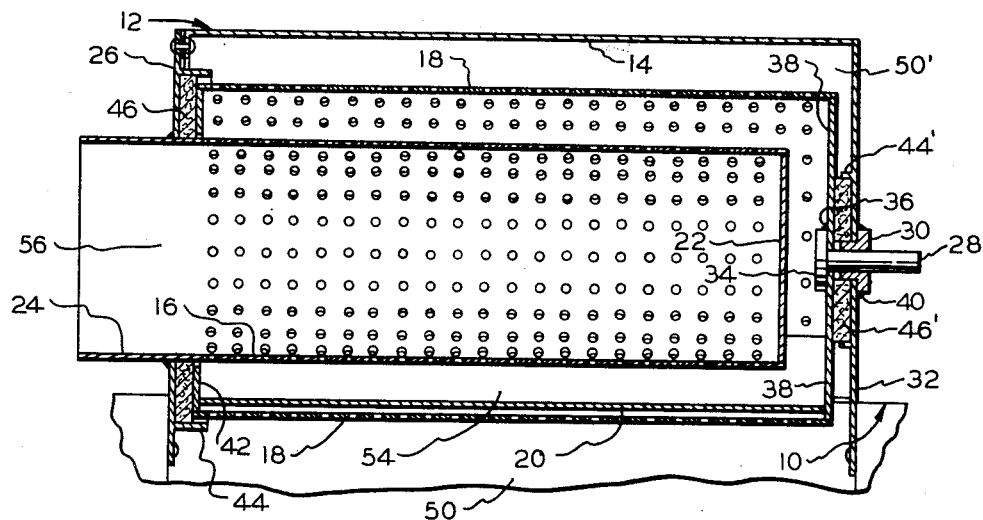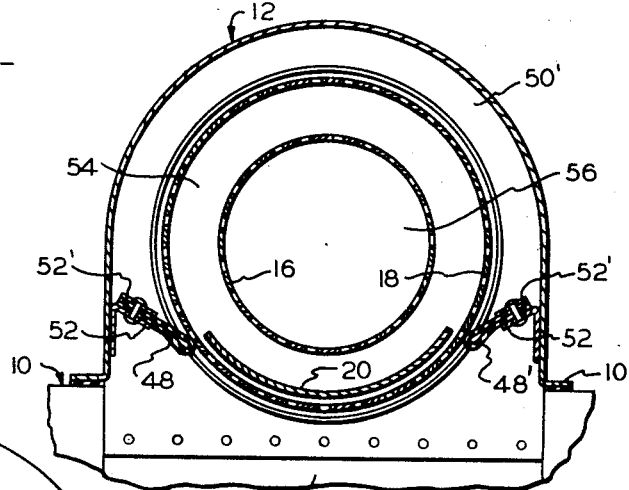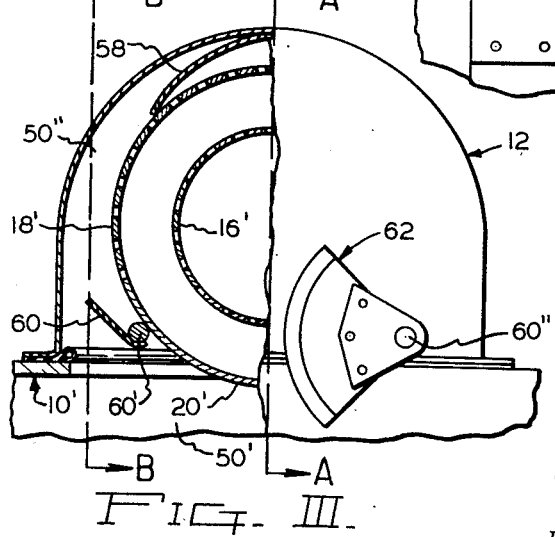

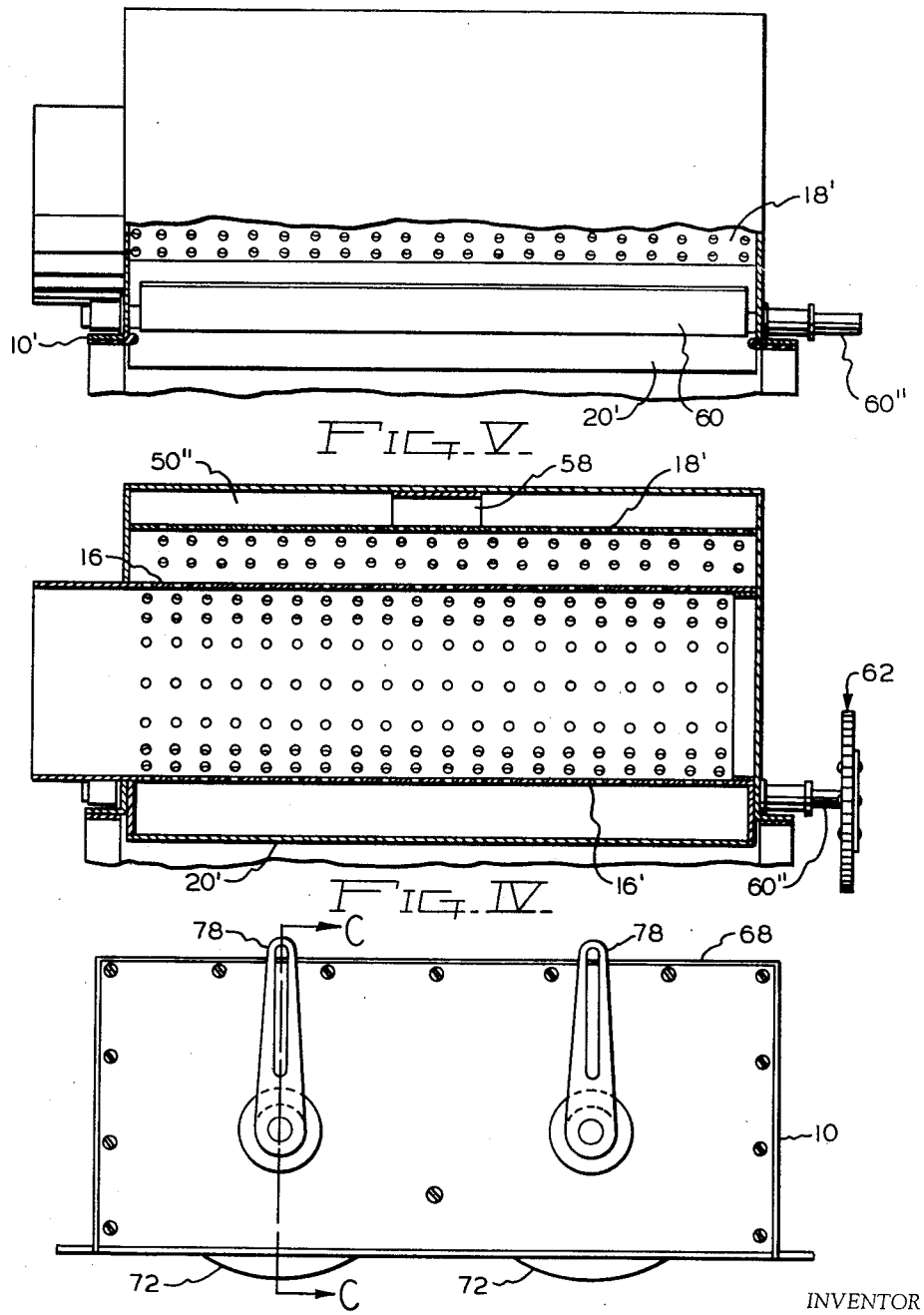

2,807,329

EXPANDER SILENCER UNIT

William J. Caldwell, Independence, Mo.

Application May 7, 1951, Serial No. 224,885

7 Claims. (Cl. 181—55)

This invention relates to expander silencer apparatus for reducing the velocity of pressurized air and in particular to expander silencer apparatus for reducing the velocity and volume of the duct supplied pressurized air in the air conditioning system disclosed in co-pending application Serial Number 187,258, filed September 28, 1950.

In the air conditioning system according to the aforesaid co-pending application there is disclosed a pressurized duct system in which exceedingly high pressure heads are encountered, being 4½ inches up to 50 inches. This results in the air supply being under compression so that it expands in volume as it travels the length of the duct system. This relatively high pressure air would be useless, however, if means were not provided for reducing the pressure prior to the introduction of the pressurized air into the rooms or spaces to be treated so that the admitted air supply falls within a usable range. The provision of suitable means, however, is by no means obvious. The provision of simple flap valves or dampers, for example, does not offer a practical solution since these would set up undesirable restrictions and turbulence in the duct system and give rise to noise, resembling the characteristic whistle produced by the velocity flow of air through restricted slots.

It thus becomes an important object of this invention to provide, for use in a high pressurized air conditioning system, a volumetric expander apparatus which is capable of metering the supply of pressurized air from the duct system into the nozzles which supply the rooms or spaces to be treated.

It is also an object of the invention to provide volumetric expander air valve means which not only controls the amount of the air emitted therefrom but which also allows the resulting expansion from the high pressures in the supply ducts to the low pressure at the room discharge nozzles to take place in such a way that noise vibrations are minimized or eliminated.

A further object of the invention is to provide expander silencer apparatus which serves the dual purpose of regulating the amount of pressurized air admitted to the room supply nozzles of the aforesaid pressurized air conditioning system and furnishing a supply of pressurized air to the room nozzles which is free of the effects of noise.

A still further object of the invention is to provide volumetric expander apparatus which forms an effective volume valve over a wide capacity range, which acts as a noise silencer, which lends itself to use by conventional damper motors, and which provides a simple means of establishing individual room control.

Further objects and advantages of the invention residing in the construction, arrangement and combination of parts will appear clear from consideration of the following description with reference to the accompanying drawings, in which:

Fig. I is a longitudinal section of an expander silencer construction in accordance with the invention, Fig. II is a vertical section of Fig. I, Fig. III is an end view, partly in section of another embodiment of the invention, Figs. IV and V are sections on the lines A—A and B—B, respectively, of Fig. III Fig. VI is an end view of a twin expander silencer assembly in accordance with the invention, Fig. VII is a side view of Fig. VI, and Figs. VIII and IX are sections on the lines C—C and D—D respectively of Figs. VI and VII, respectively.

Referring to Figs. I and II of the drawings, 10 indicates a portion of the duct of a pressurized air conditioning system, as disclosed in the said co-pending application Serial Number 187,258, along which pressurized air from a pressure vane blower is conducted for introduction to the room discharge nozzles (not shown) after passage of the pressurized air through the volumetric expander-silencer unit, indicated generally at 12.

This unit 12 is fitted into the duct 10 and comprises an outer hollow casing 14, in which there are mounted, in spaced concentric relation, a pair of concentric cylinders, consisting of the inner perforated cylinder 16 and the outer perforated cylinder 18, of which the outer cylinder is mounted in an opening in the duct 10 so as to project partly into the duct. Whereas the inner cylinder 16 is perforated over its entire surface, and is fixedly mounted in position, the outer cylinder 18 has an arcuate imperforate portion and is rotatably mounted. This imperforate outer cylinder portion can be provided by the fitting of an imperforate plate 20 to seal off an area of the perforated outer cylinder but it is apparent that the outer cylinder could be manufactured to have the required imperforate arcuate cylinder portion defined thereon.

The inner end of the inner perforate cylinder 16 is closed by an imperforate end plate 22, whereas, at its opposite end the cylinder has an imperforate extension 24 which extends through the corresponding casing end wall 26 and is adapted to connection, as by flexible hose, to conduct the air flow from the unit 12 to the room supply nozzles.

The rotatable mounting of the outer cylinder 18 can be effected in any suitable manner but is here shown as effected by a journal shaft 28 carried through the casing end wall 32 in a bearing bushing 30 and inside retaining ring 34, the latter being welded, for example, as indicated at 36, to the interior surface of the imperforate end wall 38 of the outer cylinder, the bearing bushing 30 being also shown welded at 40 to the outside of the casing end wall 32.

The outer cylinder 18 also has an annular imperforate end wall 42. Both end walls 38 and 42 are spaced from their respective casing end walls 32 and 26 and the latter are shown provided with inwardly directed ring flanges 44 and 44'. These flanges serve to retain rings 46 and 46' of felt or other suitable sealing material which function as air seals to prevent air leakage from the high pressure side into the low pressure side of the expander unit casing 12.

Fitted within the casing 12 are a pair of blades 48, 48' of sealing material, which blades seal off the lower portion 50 of the casing from the upper portion 50', the lower portion 50 being open to the pressurized air supply duct 10. These sealing blades are shown in the form of doubled-back strips secured along their outer edges, as by the angle piece 52 and the overlap strip 52', to the inside of the casing 12.

In operation, with the imperforate portion 20 of the outer cylinder 18 positioned with its imperforate portion 20 located at the bottom (as seen in Fig. II) between the sealing blades 48, 48', the flow of pressurized air from the duct 10 into the silencer unit will be completely shut off. Then, as the cylinder 18 is rotated, the perforated portion of the outer cylinder 18 is exposed to the casing portion 50, and hence to the duct 10, to a progressively increasing extent in order correctly to meter the amount of pressurized air admitted into the annular chamber 54 defined between the outer cylinder 18 and the inner cylinder 16. From the chamber 54 the air passes through the perforated inner cylinder 16 into the chamber 56. The result, therefore, is a proper metering of the pressurized air into the unit, as a whole, combined with volume control, pressure reduction in two stages (first in chamber 54 and then in chamber 56) and elimination of noise by the passage of the pressurized air through the varied perforated cylinders. The tendency for the production of a "high frequency squeal" within the unit can be eliminated by the provision of a baffle plate in the casing portion 50' as described with reference to Figs. III–V.

Referring now to Figs. III to V, the expander silencer unit disclosed therein is similar to that disclosed in the said co-pending application but is modified and improved as to the provision of an imperforate baffle plate 58 for the purpose of eliminating high frequency squeal in the unit. In this construction of expander silencer unit, reversion is made to fixed inner and outer perforated cylinders 16' and 18', respectively, with the outer cylinder having an imperforate portion 20', and the metered air flow being effected by air flow damper blades 60 pivoted at 60'. Here, the inflow duct is indicated at 10' and the lower casing chamber at 50'.

The baffle plate 58 is shown centrally fitted in the upper chamber portion 50" of the casing 12' and extends between the interior surface of the casing and the exterior surface of the outer cylinder 18'.

The imperforate cylinder portion 20', in this embodiment of the invention, is permanently exposed to the supply duct 10' and the metering action is effected by the adjustable movement of the damper blades 60, one or both of the pivot shafts 60" of which can be extended, as shown, outside the casing 12' for actuation by a quadrant gear mechanism, and for cross connecting to a companion expander on adjoining duct indicated generally at 62, and adapted for actuation so as simultaneously to actuate the two damper blades.

Figs. VI to VIII illustrate an expander silencer construction operating on the outer rotating cylinder principle, according to Figs. I and II but in the form of a twin assembly. In these figures some parts corresponding to the parts of Figs. I and II have been given the same reference characters to avoid duplication of description. The important modification resides in the provision of a pair of side-by-side inner and outer cylinder assemblies, indicated generally at 64 and 66, mounted in a common casing structure 68 and having a common central air flow seal, provided by the duplicate sealing blades 70 and 70'. These permanently seal against the exterior of the outer perforated cylinders 72 and 72', each of which has an imperforate portion defined by the plates 74 and 74'. The adjacent said cylinders 72 and 72' are sealed at each side of the common casing 68 by the fixed sealing blades 76. The desired metering effect is obtained by rotating the twin cylinders 72 and 72' as described with reference to the cylinder 18 of Figs. I and II.

In this embodiment both the outer cylinders 72 and 72' can be connected, as by the crank arms 78, interconnected by linkage and gearing (not shown) for rotation simultaneously to the same extent and in the same direction to give the same exposure of perforated surface to the duct 10 in each case.

While no attempt has been made to show in the drawings any differential in the size of the holes in the cylinders 14 and 16 of Fig. I, for example, it is to be understood that in practice different size holes would usually be required in order to provide pressure stability and smooth air flow between the inner and outer expanders.

Also, the relationship of the diameter of the cylinders 14 and 16 will vary in practice, depending upon the degree of pressure encountered in the supply duct as well as the extent of pressure reduction required. To provide an orderly expansion process, which not only gives efficiency but also serves the purpose of noise suppression without noise generation, this relationship must be carefully determined in each case.

What is claimed is:

1. An expander-silencer unit for controlling air in an air conditioning system adapted for connection into a pressurized duct work at a point adjacent an area to be air conditioned to reduce the velocity and volume of the air in the duct work with respect to the conditioned air to be admitted to the area, comprising a casing structure, an outer perforated cylinder in said casing and an inner perforated cylinder therein, said inner cylinder having an outlet adapted for connection with said area and said outer cylinder having an inlet adapted for connection with said duct work, said cylinders defining a two-stage pressure reduction assembly, and valve means in said casing structure in operative association with said outer cylinder for metering the air flow through said inlet from said duct work into said outer cylinder.

2. An expander silencer unit as defined in claim 1, said outer cylinder defining with said casing structure an outer chamber, and baffle means in said outer chamber for eliminating high frequency squeal due to the passage of the pressurized air from said duct work into said outer cylinder.

3. An expander silencer unit as defined in claim 1, said outer cylinder being rotatable in said casing structure and having an imperforate portion, and sealing means in said casing structure and in operative association with said outer cylinder to define an interior portion of said casing structure open to the said duct work for the inflow of the pressurized air into said outer cylinder to a variable extent by rotation of said outer cylinder.

4. An expander silencer unit as defined in claim 1, said inner and outer cylinders being fixed in said casing structure, and adjustable damper means in said structure for metering the flow of the pressurized air from said duct work into the said outer cylinder.

5. An expander silencer unit as defined in claim 1, said inner cylinder being fixed in said casing structure, said inner cylinder having an end portion defining said outlet, and said outer cylinder being rotatable in said casing structure, fixed sealing blades in the latter on opposite sides of the outer cylinder and contacting therewith to define separated chamber portions in said casing structures, said outer cylinder having an imperforate portion by which the air flow into the outer cylinder can be metered by rotation of said outer cylinder.

6. A twin expander silencer unit comprising common casing structure, a pair of side-by-side perforated structures in said casing structure and valved inlets in said casing structure metering the flow of pressurized air into said perforated structures, said valved inlets including sealing flops within said casing structure contacting opposite sides of said perforated structures and a common sealing flap structure between the two said perforated structures and in contact with the adjacent sides thereof, said perforated structures including imperforate portions.

7. A twin expander silencer unit as defined in claim 6, said perforated structures each including an outer rotatable perforated cylinder and an inner perforated cylinder, said outer cylinder having an imperforate portion.

References Cited in the file of this patent

UNITED STATES PATENTS

| | | |
|---|---|---|
| 681,522 | Very | Aug. 27, 1901 |
| 1,049,433 | Winslow | Jan. 7, 1913 |

(Other references on following page)

UNITED STATES PATENTS

| | | |
|---|---|---|
| 1,228,185 | Daley | May 29, 1917 |
| 1,292,283 | Faber | Jan. 21, 1919 |
| 1,496,508 | Yoakum et al. | June 3, 1924 |
| 1,512,210 | Gaskins | Oct. 21, 1924 |
| 1,567,298 | Reinhardt | Dec. 29, 1925 |
| 1,709,426 | Beery | Apr. 16, 1929 |
| 2,320,668 | Smith | June 1, 1943 |
| 2,373,741 | Caldwell | Apr. 17, 1945 |
| 2,479,165 | Jackson | Aug. 16, 1949 |
| 2,511,713 | Hoyle et al. | June 13, 1950 |
| 2,573,474 | Marx | Oct. 30, 1951 |
| 2,644,389 | Dauphinee | July 7, 1953 |
| 2,687,746 | Argentieri | Aug. 21, 1954 |

FOREIGN PATENTS

| | | |
|---|---|---|
| 112,462 | Switzerland | Jan. 2, 1926 |